United States Patent
Lipford et al.

(10) Patent No.: US 7,443,824 B1
(45) Date of Patent: Oct. 28, 2008

(54) METHOD AND SYSTEM FOR SELECTIVELY INCLUDING A DEVICE-IDENTIFIER WITHIN A MOBILE IP REGISTRATION REQUEST BEING SENT ON BEHALF OF A MOBILE NODE TO A MOBILE IP HOME AGENT

(75) Inventors: Mark A. Lipford, Leawood, KS (US); Serge M. Manning, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 960 days.

(21) Appl. No.: 10/936,856

(22) Filed: Sep. 9, 2004

(51) Int. Cl.
*H04L 12/56* (2006.01)
(52) U.S. Cl. ........................ 370/338; 370/352
(58) Field of Classification Search .......... 370/338, 370/352, 353, 354, 355
See application file for complete search history.

(56) References Cited

U.S. PATENT DOCUMENTS

| | | | |
|---|---|---|---|
| 6,522,880 B1 * | 2/2003 | Verma et al. | 455/436 |
| 6,621,810 B1 * | 9/2003 | Leung | 370/338 |
| 6,765,900 B2 * | 7/2004 | Peirce et al. | 370/351 |
| 7,224,673 B1 * | 5/2007 | Leung et al. | 370/328 |
| 7,305,090 B1 * | 12/2007 | Hayes et al. | 380/249 |
| 2004/0184420 A1 * | 9/2004 | Xu et al. | 370/328 |
| 2006/0146803 A1 * | 7/2006 | Bae et al. | 370/352 |
| 2007/0140196 A1 * | 6/2007 | Jeon et al. | 370/338 |
| 2008/0026740 A1 * | 1/2008 | Netanel | 455/419 |

* cited by examiner

*Primary Examiner*—Melvin Marcelo

(57) ABSTRACT

A method and system for selectively including a device-ID within a Mobile-IP registration request. A foreign agent, AAA server or other entity decides, based at least in part on a user-ID carried in a Mobile-IP registration request from a mobile node, whether to insert a device-ID of the mobile node into the registration request. In response to a decision to insert the device-ID, the foreign agent or another entity inserts the device-ID into the registration request and sends the request, including the device-ID, along to a Mobile-IP home agent.

21 Claims, 8 Drawing Sheets

Mobile IP Registration Process

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Length    |            Reserved           |
+-+-+-+-+-+-+-+-+-+-+-+-+-+-+-+-+-+-+-+-+-+-+-+-+-+-+-+-+-+-+-+-+
|                         Vendor/Org - ID                       |
+-+-+-+-+-+-+-+-+-+-+-+-+-+-+-+-+-+-+-+-+-+-+-+-+-+-+-+-+-+-+-+-+
|        Vendor-NVSE-Type       |         Parameter Type        |
+-+-+-+-+-+-+-+-+-+-+-+-+-+-+-+-+-+-+-+-+-+-+-+-+-+-+-+-+-+-+-+-+
|     Parameter Type (cont.)    |       Information Element     |
+-+-+-+-+-+-+-+-+-+-+-+-+-+-+-+-+-+-+-+-+-+-+-+-+-+-+-+-+-+-+-+-+
|                     Information Element (cont.)               |
+-+-+-+-+-+-+-+-+-+-+-+-+-+-+-+-+-+-+-+-+-+-+-+-+-+-+-+-+-+-+-+-+
```

NVSE for Carrying Device-ID in MIP RRQ

Fig. 8

|   |   | 1 |   |   | 2 |   |   | 3 |
|---|---|---|---|---|---|---|---|---|

```
0 1 2 3 4 5 6 7 8 9 0 1 2 3 4 5 6 7 8 9 0 1 2 3 4 5 6 7 8 9 0 1
```

| Type | Length | Vendor-ID ||
|---|---|---|---|
| Vendor-ID (cont) || Vendor-Type | Vendor-Length |
| Vendor-value ||||

RADIUS VSA for Carrying Instruction to Insert Device-ID

Fig. 9

METHOD AND SYSTEM FOR SELECTIVELY INCLUDING A DEVICE-IDENTIFIER WITHIN A MOBILE IP REGISTRATION REQUEST BEING SENT ON BEHALF OF A MOBILE NODE TO A MOBILE IP HOME AGENT

FIELD OF THE INVENTION

The present invention relates to network communications and, more particularly, to Mobile IP messaging.

BACKGROUND

Mobile IP is a standard that allows users of mobile devices to stay connected when moving from one network to another. In mobile IP, a user's device typically has an IP address associated with a "home" network. When the user leaves the home network and enters the domain of a foreign network, the foreign network uses the Mobile IP protocol to inform the home network of a "care-of" IP address to which all packets destined to the user's IP address should be sent. More particularly, a "foreign agent" (FA) (such as a LAN server or other network access server) in the foreign network may provide a "home agent" (HA) in the home network with the foreign agent's IP address to be used as a care-of address for communications to the device.

Mobile IP is commonly used in wireless packet-data communication systems, such as CDMA2000® for instance. In a CDMA2000® system, mobile nodes (such as cell phones or wirelessly-equipped computers) communicate with radio access networks (RANs), which are coupled via packet data serving nodes (PDSNs) with a packet-switched network. In this arrangement, each of the PDSNs may function as a Mobile IP foreign agent, and a home agent may sit on the packet-switched network to facilitate mobility between the various PDSNs' serving systems. In this scenario, a mobile node is always served by a "foreign agent" PDSN even when the mobile node is operating in its home network.

FIG. 1 depicts conventional operation under CDMA2000®. As shown, at step a, a mobile node would first acquire packet-data connectivity by sending a packet-data origination message into the mobile node's serving RAN. The RAN would then assign an air interface traffic channel for use by the mobile node as a radio link, and the RAN would signal to its PDSN, to trigger establishment of a data link, such as a point-to-point protocol (PPP) session, between the PDSN and the mobile node.

More particularly, at step b, a packet control function (PCF) in the RAN would send to the PDSN over a standard A10/A11 link a Mobile IP Registration Request (MIP RRQ) seeking to set up a bearer path between the PCF and the PDSN, over which the PDSN and mobile node can then engage in negotiation to set up the data link. (FIG. 1 depicts this step as "R-P Interface Setup," to reflect setup of a radio-packet interface.) This MIP RRQ may conventionally include a "critical vendor specific extension" (CVSE) that provides information about the mobile node, such as the cell/sector currently serving the mobile node, a mobile station identifier (MSID) of the mobile node, an electronic serial number (ESN) of the mobile node, and other information, to enable the PDSN to generate suitable accounting records. After further signaling between the PCF and the PDSN, a bearer channel would then be established, and the PDSN would then negotiate with the mobile node to set up a data link.

Once the PPP session is established at step c, the PDSN, as Mobile IP foreign agent, would then send a Mobile IP Agent Advertisement message to the mobile node at step d, in order to trigger a Mobile IP registration process with the home agent, i.e., to register the PDSN's address as a care-of address with the home agent.

Upon receipt of the Mobile IP Agent Advertisement message, the mobile node would then conventionally send a Mobile IP Registration Request (MIP RRQ) to the foreign agent (PDSN) at step e, providing parameters including (i) user-ID, such as NAI for instance and (ii) the IP address of the mobile node's Home Agent (which may be hard coded into the device). Further, in some implementations, the MIP RRQ may also include an "MN-AAA" parameter, which is an authentication parameter that can be used to facilitate authentication of the mobile node.

When the PDSN receives the MIP RRQ from the mobile node, the PDSN may conventionally initiate an authorization process, by consulting with a server such as a RADIUS AAA server for instance. In an example of this process, the PDSN may send a RADIUS Access Request to the AAA server at steps f and g, providing the user-ID and HA address that the PDSN received in the MIP RRQ from the mobile node. (Further, if provided in the MIP RRQ, the PDSN may also provide the MN-AAA authentication parameter.) In some cases, as shown, this RADIUS Access Request might go to a given AAA server (e.g., a foreign AAA server), which may then proxy it to another AAA server (e.g., a home AAA server), selected based on the user-ID, for handling. The AAA server may then perform an authorization process and provide a positive RADIUS Access Accept message in response to the PDSN, at step h.

Upon successful authorization of the mobile node, the PDSN may then send the MIP RRQ along to the home agent, at step i. The MIP RRQ would usually carry the same parameters as the MIP RRQ that the PDSN received from the mobile node (except that it would not include the MN-AAA parameter if that was provided). The HA may then validate the user internally or perhaps itself query the AAA server (e.g., home AAA server) to validate the user, at step j. The HA may then reply to the PDSN with a Mobile IP Registration Reply (MIP RRP) at step k, providing the home IP address assigned to the mobile node, and including a lifetime for the address. After sending an accounting "START" message to the AAA server for billing purposes, the PDSN may then send the MIP RRP along to the mobile node at step n, providing the mobile node with the assigned home IP address.

Conventionally, the Mobile IP registration process between the mobile node and the home agent is keyed to user-ID (such as an NAI), rather than device-ID (such as MSID, ESN, etc.), so as to enable users to seamlessly access their profile from any device. As a result, the Mobile IP Registration Request to the home agent does not convey a device-ID, and the PDSN and home agent are not arranged to use device-ID in the mobile node registration process as described above.

In some cases, however, it may be worthwhile to report a mobile node's device-ID to a home agent at the time of Mobile IP registration. For example, by collecting device-IDs during mobile IP registrations, a home agent can facilitate centralized fraud detection by checking whether the identified devices were reported stolen. As another example, the home agent could use the device-ID as a basis to verify that the device is a particular type of device; for instance, in a prepaid communication system, the home agent could use the device-ID as a basis to confirm that the device is a "prepaid-device" rather than some other sort of device. And as yet another example, in a prepaid scenario where account balances are keyed to devices (rather than users), the home agent could use the device-ID as a key to monitor an account balance.

On the other hand, it would be undesirable to provide a home agent with a device-ID every time a Mobile IP registration occurs. In many cases, there may be a reason to maintain the device-ID in confidence, and to therefore not reveal the device-ID to the home agent. Further, providing a device-ID to the home agent during every Mobile-IP registration could unnecessarily consume processing power and other resources.

SUMMARY

The present invention provides a mechanism for selectively communicating device-ID to a Mobile IP home agent at the time of Mobile IP registration, i.e., for communicating device-ID in certain cases but not in others. Further, the invention preferably carries out this function in a manner that does not interfere with the standard Mobile-IP registration process but rather as a supplement to the standard Mobile-IP registration process.

As a general matter, the invention involves receiving a Mobile IP registration request from a client station into a Mobile IP foreign agent and then determining, based at least in part on a user-ID carried in the registration request, that the foreign agent should insert a device-ID into the registration request. Responsive to the determination, the foreign agent then inserts the device-ID into the registration request and sends the registration request, containing the device-ID, along to the home agent.

These as well as other aspects, advantages and alternatives will become apparent to those of ordinary skill in the art by the following detailed description, with appropriate reference to the accompanying drawings.

BRIEF DESCRIPTION OF THE DRAWINGS

An exemplary embodiment of the present invention is described herein with reference to the drawings, in which:

FIG. 8 is an illustration of an exemplary Mobile-IP Normal Vendor/Organization Specific Extension arranged to carry a device-ID; and FIG. 9 is an illustration of an exemplary RADIUS Vendor Specific Attribute arranged to carry an instruction for a foreign agent to insert a mobile node's device-ID in a Mobile-IP registration request.

DETAILED DESCRIPTION OF AN EXEMPLARY EMBODIMENT

Figure 2:
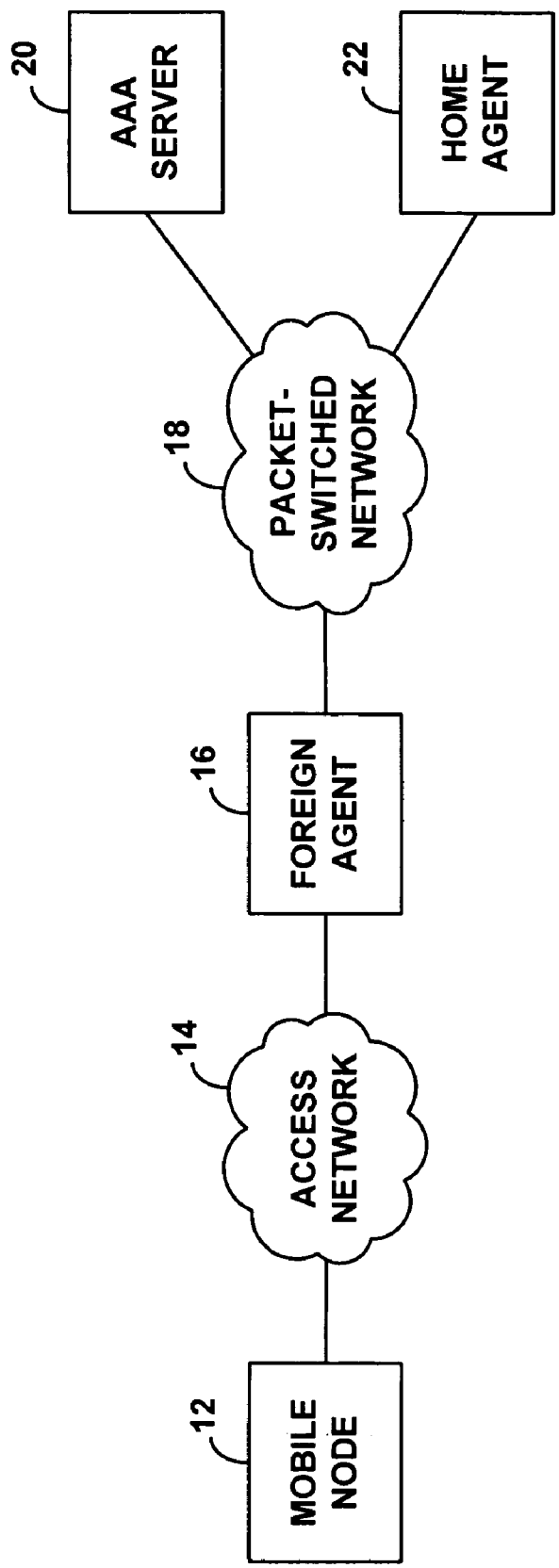
FIG. 2 is a block diagram depicting a communication system in which the exemplary embodiment can be employed.

Referring to the drawings, FIG. 2 is a simplified block diagram depicting a communication system in which an exemplary embodiment of the invention can be employed. It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and as a combination of hardware, firmware and/or software.

The communication system of FIG. 2 includes a mobile node 12, which is communicatively linked with an access network 14. The access network 14 is in turn linked with a mobile-IP foreign agent (FA) 16, which sits on a packet-switched network 18. And sitting on the packet-switched network 18 are then a AAA server 20 and a mobile IP home agent (HA) 22.

To facilitate mobile-IP registration in this arrangement, FA 16 would send an Agent Advertisement to mobile node 12, and mobile node 12 would responsively send a MIP RRQ to FA 16. FA 16 would then send a RADIUS Access-Request to AAA server 20, and AAA server 20 would respond with a RADIUS Access-Accept message. In turn, FA 16 would send the MIP RRQ along to HA 22, and HA 22 would reply with an MIP RRP, which FA 16 would forward along to mobile node 12.

As noted above, the present invention provides for selectively communicating a mobile node's device-ID in a MIP RRQ that is being conveyed to a home agent on behalf of the mobile node. In particular, at some point during communication of the MIP RRQ between the mobile node 12 and the HA 22 in the arrangement of FIG. 2, a determination will be made that a device-ID of the mobile node should be inserted into the MIP RRQ. A network entity will then insert or otherwise include the device-ID in the MIP RRQ and send the MIP RRQ, containing the device-ID, along to the HA 22.

An exemplary embodiment of the invention thus involves at least two principle functions: (1) determining whether to insert or otherwise include the mobile node's device-ID in the MIP RRQ, and (2) inserting or otherwise including the mobile node's device-ID in the MIP RRQ. Each of these functions can take various forms. Further, the functions can be carried out by a common network entity or by separate network entities.

Generally speaking, the entity that inserts the device-ID into the MIP RRQ will be an entity that sits within the MIP RRQ communication path between the mobile node 12 and the HA 22. The entity will thus receive the MIP RRQ that is being conveyed from the mobile node 12 to the HA 22 and, responsive to a decision to insert the device-ID, will insert the device-ID into the MIP RRQ and then send the MIP RRQ, including the device-ID, along to the HA 22. To facilitate this, the inserting-entity will have access to data that indicates the device-ID of the mobile node at issue. For instance, the entity could receive an earlier message that indicates the mobile node's device-ID.

In a preferred embodiment, the entity that will insert the device-ID into the MIP RRQ will be the FA 16. The FA 16 is ideally situated to carry out this function, because the mobile node 12 sends the MIP RRQ to the FA 16, and the FA 16 then sends the MIP RRQ along to the HA 22. However, some other entity in the MIP RRQ communication path, such as a gateway or proxy server for instance, could carry out the function instead.

As presently contemplated, the decision of whether to insert the mobile node's device-ID into the MIP RRQ will be based at least in part on a user-ID conveyed in the MIP RRQ or a user-ID derived from data carried in the MIP RRQ or carried in associated messaging. As such, the user-ID could be a parameter value such as an NAI that the mobile node itself includes in the MIP RRQ, or it can be a parameter value that another entity inserts into the MIP RRQ during transmission of the MIP RRQ or derives based on other known information about the mobile node or its user.

Figure 3:
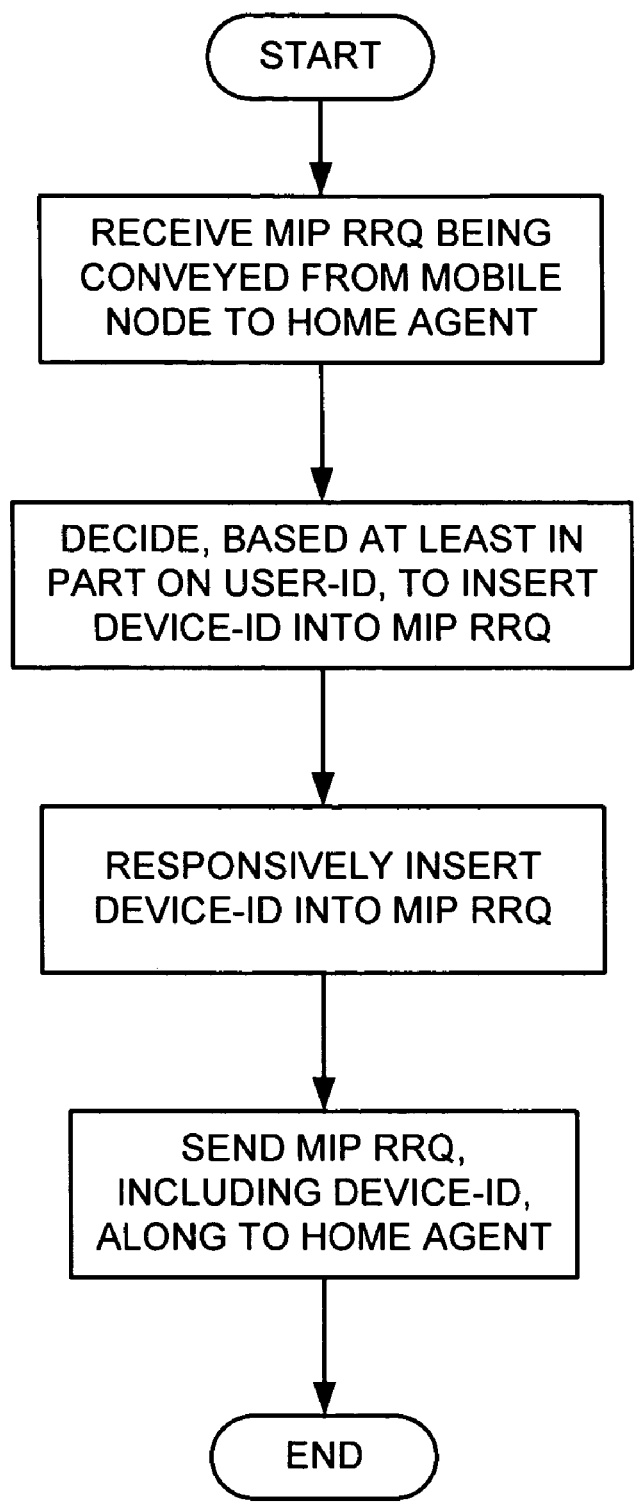
FIG. 3 is flow chart depicting a first implementation of the exemplary embodiment.

The entity that decides whether to insert the mobile node's device-ID into the MIP RRQ can be the same entity that inserts the device-ID into the MIP RRQ. By way of example, as illustrated by the flow chart of FIG. 3, for instance, the FA 16 or other entity in the MIP RRQ communication path would (i) receive the MIP RRQ being conveyed between the mobile node 12 and the HA 22, (ii) decide, based at least in part on the user-ID, to insert the device-ID into the MIP RRQ, (iii) responsively insert the device-ID into the MIP RRQ, and (iv) send the MIP RRQ, including the device-ID, along to the HA 22.

Figure 4:
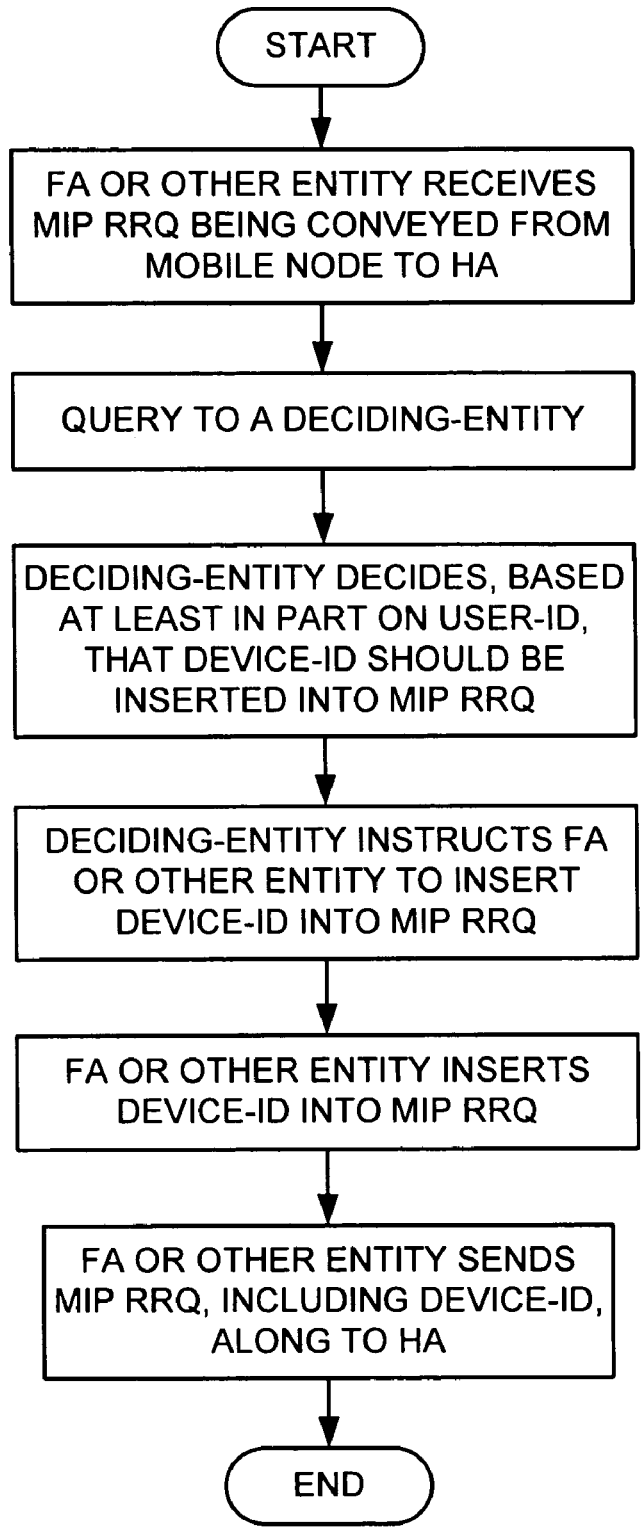
FIG. 4 is a flow chart depicting a second implementation of the exemplary embodiment.

Alternatively, the entity that decides whether to insert the mobile node's device-ID into the MIP RRQ can be an entity other than that which actually inserts the device-ID into the MIP RRQ. By way of example, as illustrated by the flow chart of FIG. 4, (i) FA 16 or another entity would receive the MIP RRQ, (ii) the FA 16 or other entity would query out to a deciding-entity, (iii) the deciding-entity would then decide, based at least in part on the user-ID, that the device-ID should be inserted into the MIP RRQ, (iv) the deciding-entity would instruct the FA 16 or other entity to insert the device-ID into the MIP RRQ, and (v) the FA 16 or other entity would then insert the device-ID into the MIP RRQ, and (vi) the FA 16 or other entity would send the MIP RRQ, including the device-ID, along to the HA 22.

In the latter scenario, the entity that inserts the device-ID into the MIP RRQ would preferably be the FA 16, and the deciding-entity would be the AAA server 20. This arrangement is particularly convenient, because the FA 16 already queries out to the AAA server 20 in the normal course, to obtain authorization before passing the MIP RRQ along to the HA 22 and further because AAA server 20 already performs a lookup typically keyed to the user-ID. However, in an alternative embodiment, the inserting-entity and deciding-entity could take other forms.

Variations on these processes are also possible. By way of example, rather than having the inserting-entity query out to a deciding-entity, the entities could operate in series in the MIP RRQ communication path. For instance, a first entity in the communication path (e.g., a gateway) can receive the MIP RRQ transmitted from the mobile node 12 and can (itself or by querying out to another entity) decide that the device-ID should be inserted into the MIP RRQ. The first entity may then send the MIP RRQ, with an insertion-instruction, along the communication path to a second entity. The second entity would then receive the MIP RRQ and insertion-instruction, responsively insert the device-ID into the MIP RRQ, and send the MIP RRQ, containing the device-ID, along to the HA 22.

Figure 1:
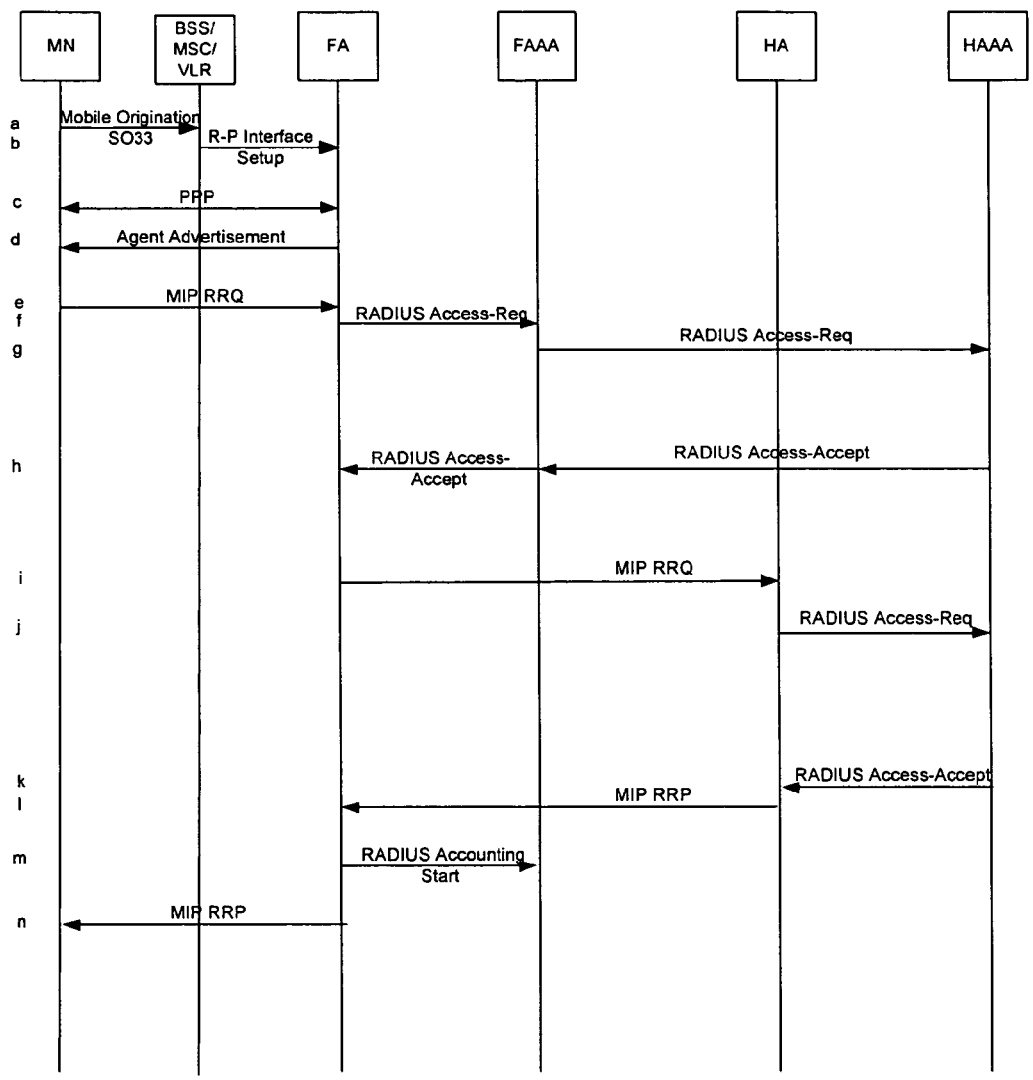
FIG. 1 is a message flow diagram depicting a prior art Mobile-IP registration process.
Figure 5:
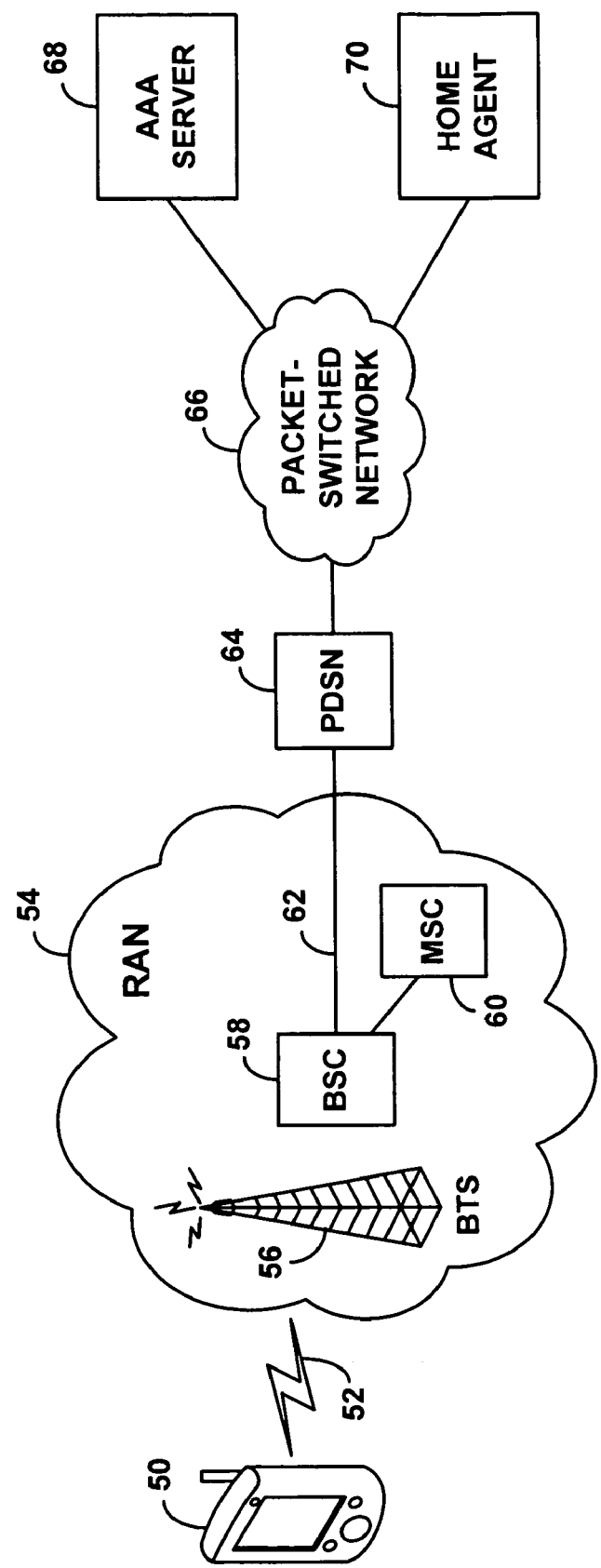
FIG. 5 is a simplified block diagram of a communication system in which the message flow of FIG. 1 can apply.

Referring next to FIG. 5, a more specific network arrangement is illustrated as an example, consistent with the CDMA2000® message flow diagram of FIG. 1. In FIG. 5, the mobile node 50 is a wireless communication device such as a cell phone or wirelessly-equipped computer or personal digital assistant (PDA). The mobile node 50 communicates over an air interface 52 with a radio access network (RAN) 54, which includes a base transceiver station (BTS) 56, a base station controller (BSC) 58, and a mobile switching center (MSC) 60. (The RAN can take other forms as well; for instance, in more advanced systems, the MSC 60 could be omitted.)

The RAN, and particularly a packet-control-function (PCF) of the BSC 58, in turn communicates over an industry standard IOS A 10/A11 interface 62 with a packet data serving node (PDSN) 64, which sits as a node on a packet-switched network 66 such as a wireless carrier's core data network. Sitting as nodes on the packet-switched network 66 are then an AAA server 68 and a Mobile-IP home agent 70.

Figure 6:
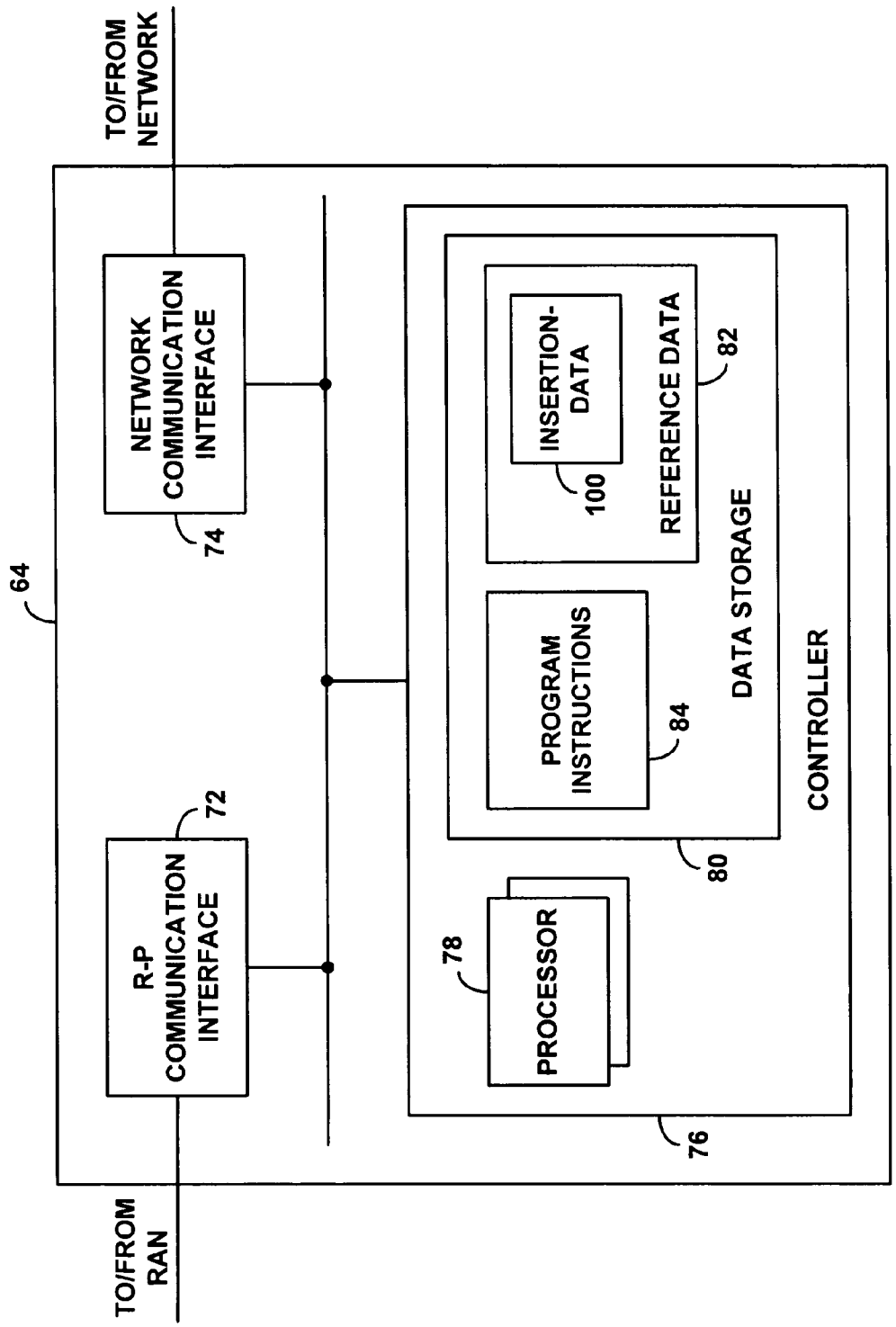
FIG. 6 is simplified block diagram of an exemplary PDSN operable in the arrangement of FIG. 5.

FIG. 6 is a simplified block diagram showing components of an example PDSN 64. As shown, the PDSN 64 includes a first communication interface 72 (e.g., an Ethernet network interface circuit) for communicating with the RAN 54, and a second communication interface 74 (e.g., also an Ethernet network interface circuit) for communicating on packet-switched network 66. Further, the PDSN 64 includes a controller 76, comprising one or more processors 78 and data storage 80. Data storage 80 contains reference data 82 and program instructions 84 executable by processor(s) 78 to carry out various functions described herein.

Figure 7:
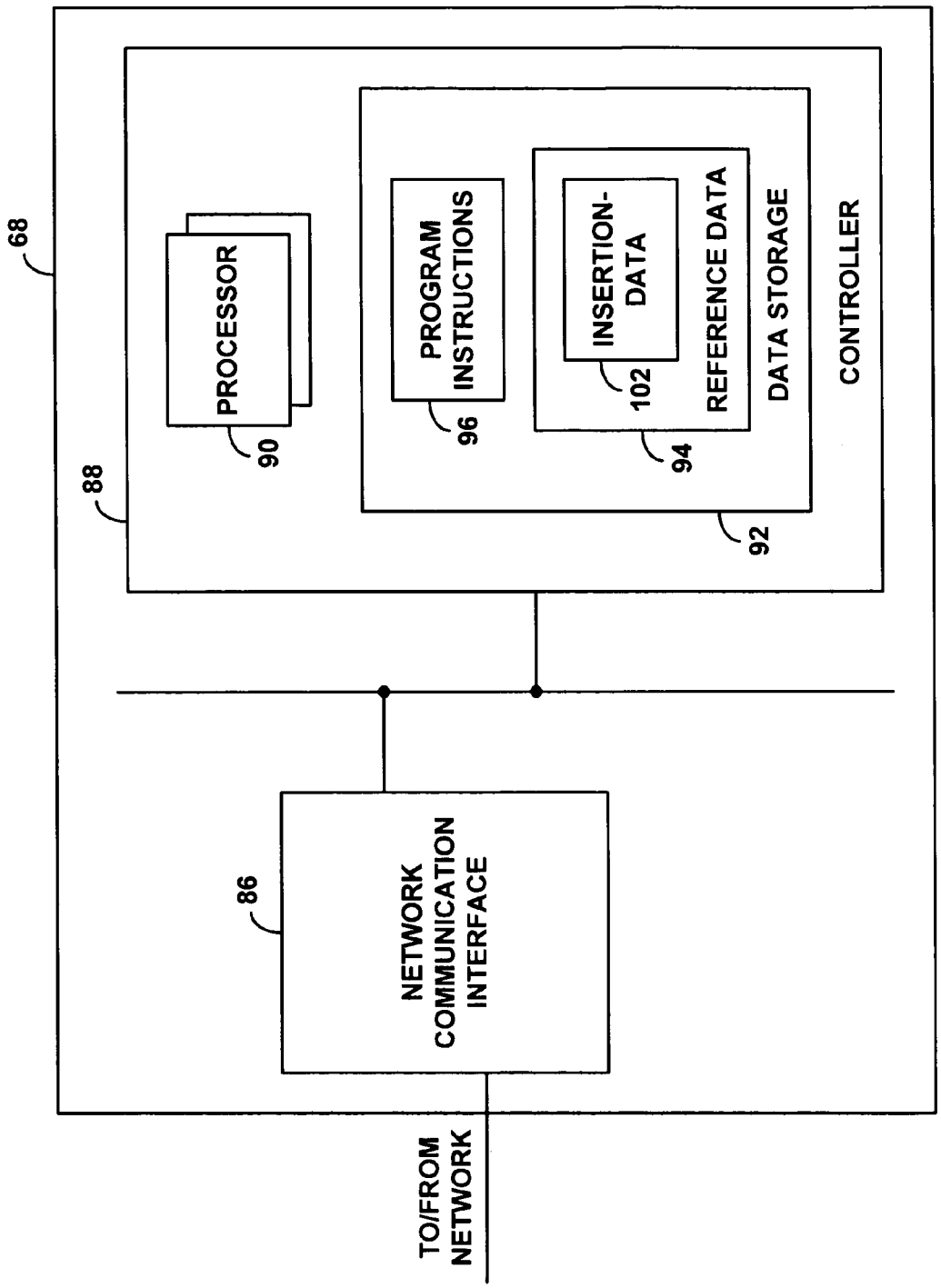
FIG. 7 is a simplified block diagram of an exemplary AAA server operable in the arrangement of FIG. 5.

FIG. 7 is next a simplified block diagram showing components of an example AAA server 68. As shown, the AAA server 68 includes a communication interface 86 (e.g., an Ethernet network interface circuit) for communicating on packet-switched network 66. Further, the AAA server 68 includes a controller 88, comprising one or more processors 90 and data storage 92. Data storage 92 contains reference data 94 and program instructions 96 executable by processor(s) 90 to carry out various functions described herein.

With this arrangement, as described in the background section above, the PDSN 64 functions as a Mobile-IP foreign agent for the mobile node 50. More particularly, in the CDMA2000® process illustrated in FIG. 1, when the mobile node 50 enters the coverage area of PDSN 64, the mobile node would send a mobile origination message to RAN 54 at step a, which would ultimately cause BSC 58 to set up an R-P link with PDSN 64. In this process, BSC 58 would send an MIP RRQ to PDSN 64 at step b, providing PDSN 64 with a CVSE that indicates the mobile node's MSID, ESN and other information. (This MIP RRQ should not be confused with the MIP RRQ sent from the mobile node to the HA.) Upon successful setup of the R-P link, the mobile node 12 would establish a PPP data link with the PDSN 64 at step c.

Over this data link, the PDSN would then send to the mobile node an Agent Advertisement message at step d. In response, the mobile node would send an MIP RRQ to the PDSN at step e, including ID the MIP RRQ a user-ID and HA address. The PDSN would then send a RADIUS Access-Request message to the AAA server 68 at steps f and g, providing the AAA server 68 with the user-ID and HA address that were specified in the MIP RRQ. Upon successful authentication, the AAA server 68 would then send a RADIUS Access-Accept message to the PDSN at step h. And the PDSN would then responsively send the MIP RRQ along to the HA 70 at step i.

In the preferred embodiment as noted above, the foreign agent will be the entity that inserts the device-ID into the MIP RRQ. Thus, in the arrangement of FIG. 5, the PDSN 64 will be the entity that inserts the device-ID into the MIP RRQ.

Preferably, the PDSN will insert the device-ID into the MIP RRQ in a manner that does not interfere with normal Mobile-IP communications. As presently contemplated, one way to do so is to insert the device-ID within a "Normal Vendor/Organization Specific Extension" (NVSE), which would be processed by a home agent that is programmed to process it but would be disregarded by a home agent that is not programmed to process it. An example NVSE could be arranged as shown in FIG. 8, to include the following fields:

(1) TYPE—An 8-bit indication of the type of extension. A value of 134 indicates that this is an NVSE, i.e., that a receiving entity can disregard it if appropriate.

(2) LENGTH—An 8-bit indication of the length of the remainder of the NVSE (not including the TYPE and LENGTH fields).

(3) RESERVED—A 16-bit field, reserved for future use, currently set to zero.

(4) VENDOR/ORG ID—A 32 bit field, in which the high-order octet is 0 and the low-order three octets are the SMI Network Management Private Enterprise Code of the Vendor in network byte order, as defined in the Assigned Numbers RFC.

(5) VENDOR-NVSE-TYPE—A 16-bit indication of the particular type of NVSE, as defined by the Vendor.

(6) PARAMETER TYPE—A 32-bit field that specifies which device-ID parameter is contained in the INFORMATION ELEMENT field. A given bit can be set (with all others cleared) to indicate that the INFORMATION ELEMENT field contains an MSID, and a different bit can be set to indicate that the INFORMATION ELEMENT field contains an ESN. Other examples are possible as well.

(7) INFORMATION ELEMENT—A variable length field that contains a string value of the device-ID of the mobile node attempting to register with the home agent.

The PDSN will insert the NVSE at the end of the MIP RRQ, such that the receiving home agent can read its type-length-value grouping and process it if appropriate. Alternatively, the PDSN could insert the NVSE elsewhere in the MIP RRQ, provided that the receiving home agent can read it if appropriate. Further, the PDSN could insert multiple NVSE instances, each specifying a respective device-ID of the mobile node. For instance, the PDSN could insert one NVSE that specifies an MSID of the mobile node and another NVSE that specifies an ESN of the mobile node. These multiple NVSEs could be positioned in series at the end of the MIP RRQ.

In line with the discussion above, the inventive process can be carried out in various ways. In a first embodiment, for instance, the PDSN itself can make the decision to insert the device-ID into the MIP RRQ, based on an analysis of the user-ID provided by the mobile node. In a second embodiment, on the other hand, the PDSN can query out to another entity, such as the AAA server 68, which can decide based on the user-ID that the PDSN should insert the device-ID into the MIP RRQ and can then instruct the PDSN to do so.

In the first embodiment, the PDSN may include or have access to a set of data that lists user-IDs, or portions of user-IDs, subject to device-ID insertion. FIG. 6 depicts this data in data storage 80 as insertion-data 100. Upon receipt of a MIP RRQ from a mobile node, the PDSN may then programmatically refer to the insertion data 100 to determine, based on the user-ID carried in the MIP RRQ, whether to insert a device-ID of the mobile node into the MIP RRQ.

Ideally, the insertion-data 100 would list categories of user-IDs, so that the PDSN would not be bogged down searching for an exact user-ID match. For instance, if the user-IDs are NAIs as defined by RFC 2794, the insertion-data 100 could list NAI realms (the portion of the NAI following the "at" sign). That way, the PDSN can simply be programmed to determine if the user-ID contained in a mobile node's MIP RRQ has a realm listed in the data and, if so, may responsively insert the device-ID of the mobile node into the MIP RRQ that the foreign agent sends to the home agent. Alternatively, the data could list specific user-IDs in full. Still alternatively, the data could list just a single realm or a single user-ID.

Further, the insertion-data 100 can specify particular types of device-IDs to insert, for particular user-IDs. For instance, the insertion-data 100 can specify that, for certain user-IDs, the PDSN should insert an MSID into the MIP RRQ, and for other user-IDs, the PDSN should insert an ESN into the MIP RRQ. Other examples are possible as well.

In the message flow diagram of FIG. 1, this first embodiment of the invention could be carried out at some point between steps e and i, preferably between steps h and i, after the PDSN receives a RADIUS Access-Accept message from the AAA server. There, the PDSN would determine, based on the user-ID contained in the mobile node's MIP RRQ, that the device-ID of the mobile node should be inserted into the MIP RRQ, and the PDSN may further determine which device-ID should be inserted. As noted above, at step b, the PDSN would have received the mobile node's device-ID, such as its MSID and/or its ESN, which would be correlated with the R-P link in use. Thus, at this point, the PDSN could then insert that device-ID into the MIP RRQ that the PDSN sends to HA 70.

In the second embodiment, when the PDSN receives the mobile node's MIP RRQ, the PDSN can signal out to another entity, which would decide based on the user-ID that the PDSN should insert the mobile node's device-ID into the MIP RRQ. Preferably, the other entity is the same AAA server 68 (e.g., home AAA server) that conventionally conducts the authorization process described above.

Conveniently, the RADIUS Access-Request that the PDSN sends to the AAA server 68 would normally include the user-ID contained in the MIP RRQ that the PDSN received from the mobile node. Thus, no change to the Access-Request is necessary to facilitate this. The AAA server 68 can simply be programmed to determine, based on the user-ID, whether the PDSN should include the device-ID in the MIP RRQ, and, if so, the AAA server can instruct the PDSN to do so.

In practice, the AAA server can include or have access to data that indicates which user-IDs are subject to device-ID insertion. FIG. 7 depicts this data in data storage 92 as insertion-data 102. This insertion-data 102 can be similar in form to the insertion-data 100 described above in the first embodiment. Alternatively, the data can take other forms.

Given that the AAA server conventionally refers to subscriber profile records to conduct authorization, insertion-data 102 could take the form of indications in subscriber profile records or could be otherwise integrated with subscriber profile records. By way of example, the AAA server could use the user-ID to pull up a subscriber profile record and may determine from the subscriber profile record that the user is a particular type of subscriber, and the AAA server may responsively conclude that the device-ID should be inserted in the MIP RRQ. Further, the subscriber profile or other data could indicate specifically which type of device-ID (e.g., MSID, ESN, etc.) the PDSN should insert.

As another example, it is possible that the PDSN or other entity (e.g., a foreign AAA server) may use the user-ID as a basis to select a particular AAA server (e.g., a home AAA server) to perform authorization. For instance, a given AAA server may serve a given category of users (having a given category of user-IDs), and another AAA server may serve a different category of users (having a different category of user-IDs). In this arrangement, a given AAA server could be programmed to conclude that the device-ID should be inserted into the MIP RRQ whenever the AAA successfully authorizes (validates) a user, and yet another AAA serve might not be so programmed. Consequently, this is another example of deciding, based on the user-ID, whether to insert the device-ID into the MIP RRQ.

In the preferred embodiment, if the AAA server 68 concludes that the PDSN should insert the device-ID within the MIP RRQ, the AAA server 68 will then include in its RADIUS Access-Accept message to the PDSN an instruction for the PDSN to do so. (In practice, the AAA server 68 would thus determine based on the user-ID that the AAA server 68 should insert the instruction into the RADIUS Access-Accept message.) In order to do this in a manner that does not interfere with normal RADIUS messaging, in the preferred embodiment, the AAA server can provide the instruction in a RADIUS "Vendor Specific Attribute" (VSA), which is a RADIUS parameter that a receiving entity can disregard if appropriate. An example RADIUS VSA can be arranged as shown in FIG. 9 to include the following fields:

(1) TYPE—An 8-bit indication of the type of attribute. A value of 26 may indicate that it is an optional, i.e., that a receiving entity can disregard it if appropriate.

(2) LENGTH—An 8-bit indication of the length of the remainder of the VSA.

(3) VENDOR-ID—A 32-bit field indicating the Vendor.

(4) VENDOR-TYPE—An 8-bit indication of the particular type of VSA, as defined by the Vendor. For instance, the VENDOR-TYPE may indicate that the VSA carries an instruction to insert a device-ID in an MIP RRQ.

(5) VENDOR-LENGTH—An 8-bit indication of the length of the VENDOR-VALUE. For instance, the VENDOR-LENGTH may specify a length of 4 octets to be used for specifying a device-ID parameter. (A VENDOR-LENGTH of 4 octets would provide for the 32-bit VENDOR-VALUE field as noted below. In theory, a different VENDOR-LENGTH could be provided if desired.)

(6) VENDOR-VALUE—A 32-bit field that specifies which device-ID parameter(s) the foreign agent is to insert in the MIP RRQ. A given bit can be set (with all others cleared) to indicate that the foreign agent is to insert an MSID, and a different bit can be set to indicate that the foreign agent is to insert an ESN, or both bits can be set to indicate both MSID and ESN. Other examples are possible as well.

In the event more than 32 device-ID parameter(s) exist or more than 32 bits are needed to provide device-ID insertion instructions in a given instance, multiple VENDOR-TYPE/VENDOR-LENGTH/VENDOR-VALUE groupings could be defined to specify the additional device-ID parameter(s) or device-ID insertion instructions.

In the message flow diagram of FIG. 1, this second embodiment of the invention could be carried out as follows. At step g, the AAA server would receive a RADIUS Access-Request message from the PDSN, including a user-ID such as an NAI. The AAA server would then refer to its insertion-data 102 to decide, based at least in part on the user-ID, that the PDSN should insert a particular type of device-ID (e.g., MSID, ESN, etc.) into the MIP RRQ. At step h, the AAA server would then send a RADIUS Access-Accept message to the PDSN, including in the Access-Accept message a VSA specifying that the PDSN should insert the particular type of device-ID into the MIP RRQ. The PDSN would then receive that RADIUS Access-Accept message and would programmatically read the VSA and thereby determine that it should insert the device-ID into the MIP RRQ. Thus, the PDSN would responsively insert the device-ID into the MIP RRQ, in an NVSE for instance (or in some other manner) and, at step i, send the MIP RRQ, containing the device-ID, to HA 70.

An exemplary embodiment of the invention has been described above. Those skilled in the art will understand, however, that changes and modifications may be made to the embodiment described without departing from the true scope and spirit of the invention, which is defined by the claims.

By way of example, although the foregoing generally discusses inserting a device-ID into an MIP RRQ that is being conveyed from a mobile node to a home agent, the invention could extend to otherwise including the device-ID in the MIP RRQ. For instance, in an alternative embodiment, MIP RRQ that the foreign agent receives could already contain a device-ID of the mobile node (inserted into the MWP RRQ by the mobile node or by another entity in the communication path), and the invention could extend to deciding whether or not to maintain that device-ID in the MIP RRQ. Based on the user-ID, for instance, the foreign agent or AAA server could decide that the foreign agent should maintain the device-ID in the MIP RRQ or should delete it from the MIP RRQ.

Other examples are possible as well.

We claim:

1. In a Mobile-IP communication system in which a foreign agent receives from a mobile node a Mobile IP Registration Request (MIP RRQ) carrying a user-ID, and the foreign agent sends the MIP RRQ thereafter to a Mobile IP home agent to seek Mobile IP registration of the mobile node, a method comprising the following functions carried out after receiving the MIP RRQ at the foreign agent:

making a determination, based on the user-ID, that the foreign agent should insert a device-ID of the mobile node into the MIP RRQ;

in response to the determination, the foreign agent inserting the device-ID into the MIP RRQ; and the foreign agent then sending the MIP RRQ, containing the device-ID, to the home agent.

2. The method of claim 1, wherein inserting the device-ID into the MIP RRQ comprises inserting the device-ID into a Normal Vendor/Organization Specific Extension (NVSE) in the MIP RRQ.

3. The method of claim 1, wherein making the determination comprises the foreign agent making the determination.

4. The method of claim 3, wherein making the determination comprises:

reading the user-ID from the MIP RRQ received from the mobile node; and referring to reference data to determine, based on the user-ID, that the device-ID should be inserted in the MIP RRQ.

5. The method of claim 4, wherein the reference idea specifies categories of user-IDs with respect to which a device-ID should be inserted into an MIP RRQ, and wherein referring to the reference data to determine, based on the user-ID, that the device-ID should be inserted in the MIP RRQ comprises:

determining that the user-ID falls within a category specified by the reference data.

6. The method of claim 5, wherein the user-IDs are network access identifiers (NAIs), each having a username portion and a realm portion, and wherein the category is a particular realm, so that determining that the user-ID falls within the category comprises determining that the user-ID contains the particular realm.

7. The method of claim 1, wherein making the determination comprises an entity other than the foreign agent making the determination and instructing the foreign agent to insert the device-ID into the MIP RRQ.

8. The method of claim 7, wherein after the foreign agent receives the MIP RRQ from the mobile node, but before the foreign agent sends the MIP RRQ to the home agent, the foreign agent sends to an authorization server an authorization request message carrying the user-ID, and wherein the entity that makes the determination comprises the authorization server.

9. The method of claim 8, wherein the entity making the determination comprises the authorization server carrying out the following functions:
   reading the user-ID from the authorization request message; and
   referring to reference data to determine, based on the user-ID, that the authorization server should respond to the foreign agent with an instruction directing the foreign agent to insert the device-ID in the MIP RRQ.

10. The method of claim 9, wherein the reference data comprises a subscriber profile record.

11. The method of claim 8, wherein the authorization request message comprises a RADIUS Access-Request message.

12. The method of claim 8, wherein the authorization server responds to the foreign agent with an authorization response message, and wherein instructing the foreign agent to insert the device-ID into the MIP RRQ comprises:
   inserting an instruction into the authorization response message; and
   sending the authorization response message to the foreign agent.

13. The method of claim 12, wherein the authorization response message comprises a RADIUS Access-Accept message.

14. The method of claim 13, wherein inserting the instruction into the authorization response message comprises inserting the instruction in a RADIUS vendor specific attribute (VSA) in the Access-Accept message.

15. The method of claim 1, wherein the foreign agent comprises a packet-data serving node that interconnects a radio access network and a packet-switched network.

16. The method of claim 1, wherein the mobile node comprises a cellular wireless communication device.

17. The method of claim 16, wherein the device-ID comprises an ID selected from the group consisting of a mobile station identifier (MSID), and an electronic serial number (ESN).

18. In a Mobile-IP communication system in which a foreign agent receives from a mobile node a Mobile IP Registration Request (MIP RRQ) carrying a user-ID, and the foreign agent sends the MIP RRQ thereafter to a Mobile IP home agent to seek Mobile IP registration of the mobile node, the improvement comprising:
   data storage in the foreign agent;
   program logic stored in the data storage and executable by a processor of the foreign agent, after receiving the MIP RRQ at the foreign agent, (i) to make a determination, based on the user-ID, that the foreign agent should insert a device-ID of the mobile node into the MIP RRQ, (ii) to insert the device-ID into the MIP RRQ in response to the determination, and (iii) to send the MIP RRQ, including the device-ID, to the home agent.

19. In a Mobile-IP communication system in which a foreign agent receives from a mobile node a Mobile IP Registration Request (MIP RRQ) carrying a user-ID, the foreign agent then sends to an authorization server an authorization request message carrying the user-ID and receives in response from the authorization server an authorization response message, and the foreign agent then sends the MIP RRQ to a Mobile IP home agent to seek Mobile IP registration of the mobile node, the improvement comprising:
   means at the authorization server for deciding, based on the user-ID, to include in the authorization response message an instruction directing the foreign agent to provide a device-ID of the mobile node in the MIP RRQ, and for responsively including the instruction in the authorization response; and
   means at the foreign agent for reading the instruction in the authorization response and responsively providing the device-ID in the MIP RRQ that the foreign agent sends to the home agent.

20. The improvement of claim 18, wherein the foreign agent comprises a packet-data serving node that interconnects a radio access network and a packet-switched network.

21. A method comprising the following steps:
   receiving a Mobile-IP registration request that is being conveyed from a mobile node to a home agent;
   making a decision, based at least in part on a user-ID associated with the registration request, to include a device-ID of the mobile node in the registration request;
   responsive to the decision, including the device-ID in the registration request; and
   sending the registration request, including the device-ID, along to the home agent.

* * * * *